Patented Dec. 7, 1948

2,455,612

UNITED STATES PATENT OFFICE 2,455,612

COMPOSITIONS COMPRISING A POLYVINYL CHLORIDE RESIN STABILIZED WITH THE ALKALI METAL SALTS AND THE ALKALINE EARTH METAL SALTS OF ORTHO-SULFO-BENZIMIDE

Russell H. Schlattman, Richmond Heights, Mo., assignor to Monsanto Chemical Company, St. Louis, Mo., a corporation of Delaware No Drawing. Application July 19, 1947,
Serial No. 762,208

4 Claims. (Cl. 260—88)

This invention relates to improved compositions containing predominantly polymerized vinyl chloride. More particularly, this invention relates to plasticized compositions having improved heat stability and containing polymerized vinyl chloride, vinyl chloride copolymers, or combinations thereof, collectively and broadly herein referred to in the description and claims as "polyvinyl chloride compositions."

Polyvinyl chloride compositions have found many useful applications because of their wide range of elastomeric and mechanical properties coupled with their extreme resistance to oxidation, organic solvents, acids and alkalies. Typical of such applications are calendered films and sheeting for wearing apparel, shower curtains and seat and cushion coverings, extruded insulation for electrical wiring and injection molded rigid articles such as bottle caps, drawing instruments and floor coverings.

The processing techniques necessary for the fabrication of many of these articles from polyvinyl chloride compositions often require that the compositions be exposed to elevated temperatures for extended periods of time. The time and temperature of such exposures may vary from 10 minutes to 1 hour and at temperatures of 130° C. to 160° C. It has been found, however, that under the more extreme conditions of time and temperature, many of the polyvinyl chloride compositions tend to deteriorate, resulting in darkening or discoloration. In many applications such deterioration is undesirable as accurate color control is quite difficult to maintain and articles of inferior or undesired coloration result. The evaluation of this tendency of a polyvinyl chloride composition to discolor on prolonged exposure to heat or elevated temperatures is commonly referred to by those skilled in the art as the composition's heat stability.

An object of this invention is to provide new compositions, particularly plasticized compositions, containing predominantly polyvinyl chloride and having improved heat stability. A further object is to provide a method for improving the heat stability of compositions containing predominantly polyvinyl chloride. Other objects of this invention will be apparent to those skilled in the art from the following description, examples and claims.

I have found that the heat stability of compositions containing predominantly polyvinyl chloride may be increased and the amount of discoloration of such compositions, when exposed to prolonged heating, may be substantially reduced by incorporating into the polyvinyl chloride compositions minor amounts of the alkali metal salts or alkaline earth metal salts of ortho-sulfobenzimide. Preferably, there is employed either the sodium salt of ortho-sulfobenzimide or the barium salt of ortho-sulfobenzimide.

In order to test the desirability and utility of the above-mentioned compounds as heat stabilizers for polyvinyl chloride compositions, a composition was prepared containing 60 parts by weight of a polyvinyl chloride resin formed by the polymerization of vinyl chloride, 38 parts of 2-ethylhexyl diphenyl phosphate plasticizer and 2 parts of barium ortho-sulfobenzimide. The said resin, plasticizer and stabilizer were intimately mixed and fluxed on a differential speed roll mill for 5 minutes at 160° C. When a homogeneous composition had formed on the roll, the plasticized polyvinyl chloride composition was sheeted off the roll mill. As a control, a second composition was prepared in the same manner containing 60 parts by weight of the same type of polyvinyl chloride resin, 40 parts by weight of 2-ethylhexyl diphenyl phosphate plasticizer but no heat stabilizer was added to the control composition.

Specimens of each of these compositions were then placed in a mold 2" x 2" x 0.040" and subjected to a pressure of 2,000 pounds per square inch and a temperature of 160° C. After being maintained at this pressure and temperature for 30 minutes the specimens were removed from the molds and the amount of discoloration in each sample observed. The control which contained no thermal stabilizer had become almost opaque and was red brown in color. On the other hand, the sample that contained the barium ortho-sulfobenzimide thermal stabilizer showed very little discoloration, resulting in a highly transparent pale yellow sheet.

A third composition was prepared, rolled, fluxed, sheeted and molded as in the first example, with the exception that calcium ortho-sulfobenzimide was substituted for the barium ortho-sulfobenzimide of the above example. After heating for 30 minutes at 160° C., the sample containing calcium ortho-sulfobenzimide as a thermal stabilizer was inspected for discoloration. It was noted that this sample was transparent and of a light yellow coloration, which is indicative of substantially improved heat stability characteristics. A fourth sample was prepared in the same manner, however, the sodium salt of ortho-sulfobenzimide was substituted for the barium salt of the first example. After heating for 30 minutes at 160° C., the molded sample was very flexible and supple and showed no sign of decomposition, although the sample had assumed a slight orange-yellow discoloration. I have found that the thermal stabilizers of this invention may be incorporated into polyvinyl chloride compositions in an amount of 0.5% to 5% of the weight of the finished composition with resulting highly desirable heat stable properties. The amount of the thermal stabilizer incorporated into the polyvinyl chloride compositions may even be increased to 10% with desirable heat stabilizing results.

The compositions of this invention may also contain carbon black, zinc oxide, clay, wood flour, and other pigments and fillers commonly used in the plastics industry. The stabilizing effect of the thermal stabilizers of this invention are realized in unplasticized compositions as well as compositions that are plasticized with many of the other common plasticizers used in the plastic industry, such as dioctyl phthalate and tricresyl phosphate.

Many compounds and compositions which have been described in the prior art as "basic heat stabilizers" have been incorporated into compositions containing polyvinyl chloride to retard or prevent the initial discoloration or darkening which results from the processing of polyvinyl chloride compositions at elevated temperatures. These basic heat stabilizers such as basic lead silicate, basic lead carbonate and basic lead acetate have resulted in compositions having improved heat stability characteristics but the degree of thermal stability to be achieved by the use of these basic heat stabilizers is not entirely satisfactory, particularly when the time of processing must be of the order of 30 minutes to one hour at temperatures of the order of 160° C., rather than relatively short processing times of the order 5 to 15 minutes. However, I have found that by the use of an alkali metal salts or an alkaline earth metal salts of ortho-sulfobenzimide, in cooperation with the basic heat stabilizers, there is a synergistic heat stabilizing action of the basic heat stabilizers and the alkali metal or alkaline earth metal salts of ortho-sulfobenzimide, resulting in compositions having thermal stabilities of improved proportions that cannot be achieved by the use of the basic heat stabilizers alone without the cooperation and synergistic heat stabilizing action of the alkali metal salt or the alkaline earth metal salt of ortho-sulfobenzimide.

A composition was prepared by intimately mixing 56 parts by weight of a polyvinyl chloride resin with 40 parts of 2-ethylhexyl diphenyl phosphate plasticizer, 2 parts by weight of basic lead silicate and 2 parts by weight of the barium salt of ortho-sulfobenzimide. This mixture was worked and fluxed on a differential speed roll mill at 160° C. until a homogeneous composition was formed on the roll and then the composition was sheeted off of the rolls. A portion of the sheet was molded in a 2" x 2" x 0.04" mold at 2,000 pounds per square inch and maintained at this pressure at a temperature of 325° F. for 30 minutes. A control specimen was prepared in a similar manner using a composition containing 58 parts by weight of the same type of polyvinyl chloride resin, 40 parts by weight of 2-ethylhexyl diphenyl phosphate plasticizer and 2 parts by weight of basic lead silicate. A comparison of these 2 specimens show that the composition containing only the basic lead silicate as a heat stabilizer had a light orange coloration, indicating a degree of heat stabilization whereas the sample containing the basic lead silicate and the barium salt of ortho-sulfobenzimide was highly transparent and of a very light yellow coloration.

Though particular reference has been made to compositions of polyvinyl chloride resins, the alkali metal salts and the alkali earth metal salts of ortho-sulfobenzimide may be very desirably used to heat stabilize compositions containing resins that are formed through the conjoint polymerization of mixtures of monomers that are predominantly vinyl chloride such as mixtures of vinyl chloride and varying amounts of vinyl esters of carboxylic acids. These copolymers containing predominantly vinyl chloride are exemplified by copolymers containing 95 to 85% by weight of vinyl chloride and 5 to 15% by weight of vinyl acetate, vinylidine chloride, diethyl maleate or methyl methacrylate.

Though I have herein set forth specific embodiments of my invention, it is not my intention to be limited wholly thereto. For to those skilled in the art there are many apparent variations and modifications such as the variations of quantities used and a substitution of equivalent materials that do not depart from the scope of my invention as set forth in the following claims.

I claim:

1. A polymerized vinyl chloride composition characterized by improved heat stability and being comprised of a polymerized vinyl resin containing at least 85% of combined vinyl chloride and from 0.5 to 10% by weight of a compound selected from the alkali metal salts and the alkaline earth metal salts of ortho-sulfobenzimide.

2. A plasticized polymerized vinyl chloride composition characterized by improved heat stability and being comprised of a polymerized vinyl resin containing at least 85% combined vinyl chloride, a plasticizer, from 0.5 to 10% by weight of a basic lead salt heat stabilizer, and from 0.5 to 10% by weight of a compound selected from the alkali metal salts and the alkaline earth metal salts of ortho-sulfobenzimide.

3. A plasticized composition of matter comprising a polyvinyl chloride resin, a plasticizer and from 0.5 to 10% by weight of barium ortho-sulfobenzimide.

4. A plasticized composition of matter characterized by improved heat stability and comprising a polyvinyl chloride resin, a plasticizer, from 0.5 to 10% by weight of the barium salt of ortho-sulfobenzimide and from 0.5 to 10% by weight of a basic lead salt heat stabilizer.

RUSSELL H. SCHLATTMAN.

REFERENCES CITED

The following references are of record in the file of this patent:

UNITED STATES PATENTS

| Number | Name | Date |
|---|---|---|
| 2,319,953 | Scott | May 25, 1943 |
| 2,319,954 | Scott | May 25, 1943 |